US009759937B2

(12) United States Patent
Reightler et al.

(10) Patent No.: US 9,759,937 B2
(45) Date of Patent: Sep. 12, 2017

(54) DISPLAY WITH INTEGRATED BACKLIGHT

(71) Applicant: Apple Inc., Cupertino, CA (US)

(72) Inventors: Seth R. Reightler, San Francisco, CA (US); Tyler R. Kakuda, Stockton, CA (US); Lee E. Hooton, Cupertino, CA (US); Alexander D. Schlaupitz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 14/863,260

(22) Filed: Sep. 23, 2015

(65) Prior Publication Data

US 2016/0320658 A1    Nov. 3, 2016

Related U.S. Application Data

(60) Provisional application No. 62/154,624, filed on Apr. 29, 2015.

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0088* (2013.01); *G02F 1/133514* (2013.01); *G02F 2001/133317* (2013.01); *G02F 2001/133325* (2013.01)

(58) Field of Classification Search
CPC ......... G02F 1/133308; G02F 1/133514; G02F 2001/133317; G02F 2001/133325; G02F 2001/133331; G02B 6/0088
See application file for complete search history.

(56) References Cited

U.S. PATENT DOCUMENTS

| 6,600,526 | B2 | 7/2003 | Yano |
| 8,587,935 | B2* | 11/2013 | Lee ................... G02F 1/133308 |
| | | | 349/58 |
| 9,104,066 | B2* | 8/2015 | Ogatsu ............... H04M 1/0202 |
| 2009/0185100 | A1* | 7/2009 | Matsuhira .............. G02B 6/005 |
| | | | 349/58 |

(Continued)

FOREIGN PATENT DOCUMENTS

WO    2014130986    8/2014

*Primary Examiner* — Nathanael R Briggs
(74) *Attorney, Agent, or Firm* — Treyz Law Group, P.C.; Kendall W. Abbasi

(57) ABSTRACT

An electronic device may be provided with electrical components mounted in an electronic device housing. A display module may be attached to a display cover layer with a layer of adhesive to form a display module assembly. The display module assembly and a backlight unit assembly may together form a display that is mounted within an electronic device housing. A support structure that supports the display cover layer may be integrated with the backlight unit assembly. The support structure may have an upper surface to which the display cover layer is attached and a lower portion that is molded to a metal chassis that supports the backlight unit. The lower portion of the support structure may form a plastic chassis that surrounds the backlight unit. In this way, an integrated support structure may be used to support both the display module and the backlight unit.

20 Claims, 8 Drawing Sheets

(56) References Cited

U.S. PATENT DOCUMENTS

| | | | |
|---|---|---|---|
| 2012/0262644 A1* | 10/2012 | Zhang | G02F 1/133308 349/62 |
| 2013/0063978 A1 | 3/2013 | Gettemy et al. | |
| 2014/0118661 A1 | 5/2014 | Qi et al. | |
| 2014/0146524 A1* | 5/2014 | Choi | G02B 6/0085 362/97.1 |
| 2014/0211122 A1 | 7/2014 | Wurzel et al. | |

\* cited by examiner

DISPLAY WITH INTEGRATED BACKLIGHT

This application claims the benefit of provisional patent application No. 62/154,624 filed on Apr. 29, 2015, which is hereby incorporated by reference herein in its entirety.

BACKGROUND

This relates generally to electronic devices and, more particularly, to electronic devices with displays.

Electronic devices often have displays. Displays may be protected using cover glass layers. For example, a cover glass layer may be attached to the front of a liquid crystal display module to prevent layers in the liquid crystal display module from becoming damaged. A backlight unit that provides the liquid crystal display module with backlight is attached to the liquid crystal display module with a strip of adhesive. During assembly, the liquid crystal display module and the attached display cover layer and backlight unit may be mounted within a device housing. The housing may be strengthened using a metal midplate that is separated from the backlight unit by an air gap.

Challenges arise when mounting components such as display components in an electronic device. If care is not taken, the display components may be overly bulky or may be characterized by excessively wide inactive border regions.

It would therefore be desirable to be able to provide electronic devices with improved display arrangements.

SUMMARY

An electronic device may be provided with electrical components mounted in an electronic device housing. The electronic device may have a display such as a liquid crystal display. The liquid crystal display may be formed from a liquid crystal display module having polarizers, a thin-film transistor layer, a color filter layer, and a layer of liquid crystal material.

The display module may be attached to a display cover layer with a layer of adhesive to form a display module assembly.

The display module assembly and a separate backlight unit may be assembled to form a display module. The display module and backlight unit may be installed within the electronic device housing using attachment mechanisms such as welds or fasteners. Display module assembly layers and backlight unit structures may also be assembled directly into the electronic device housing without forming the display module.

A support structure that supports the display module assembly when the display module assembly is mounted in the electronic device housing may be integrated with the backlight assembly. For example, the support structure may have an upper portion that forms a display module chassis and a lower portion that forms a backlight chassis. An adhesive may be used to attach the display cover layer to the upper portion of the support structure. The lower portion of the support structure may be injection molded over a metal chassis that supports the backlight unit.

During assembly operations, the display module assembly may be formed by attaching a display module to a display cover layer. The backlight unit may be formed by molding a plastic chassis over a metal chassis and by subsequently mounting backlight structures within a recess defined by the plastic chassis and metal chassis. The plastic backlight chassis may be molded to include an upper shelf portion for receiving the display cover layer.

After the display module assembly and the backlight unit have been separately assembled, the display module assembly may be mounted to the backlight unit by attaching the display cover layer to an upper surface of the plastic chassis. This display assembly may then be mounted in the electronic device housing. If desired, the plastic chassis may be designed such that an upper portion of the plastic chassis is interposed between the display cover layer and the electronic device housing.

Alternatively, the backlight unit and display module assembly may be mounted in the electronic device housing prior to being coupled to one another. Once mounted in the electronic device housing, the display cover layer may be fixed to the upper surface of the plastic chassis structure.

Further features, their nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
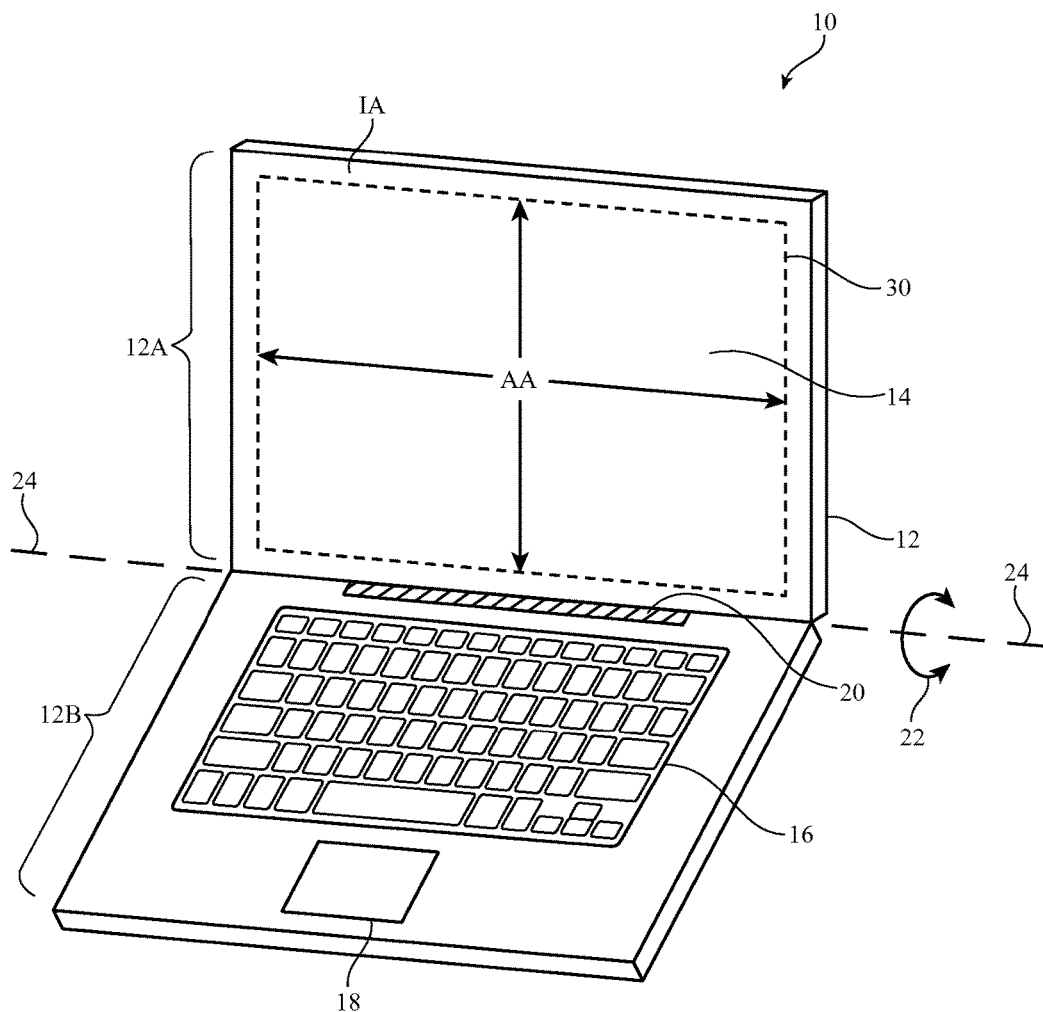
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
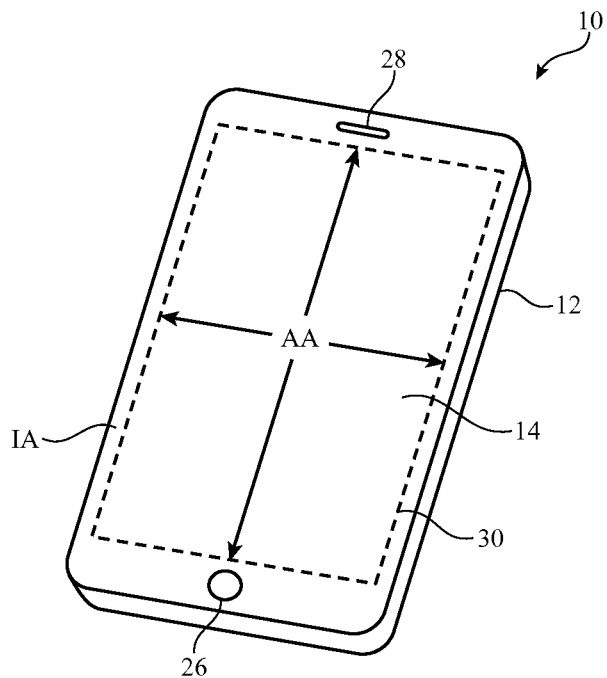
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
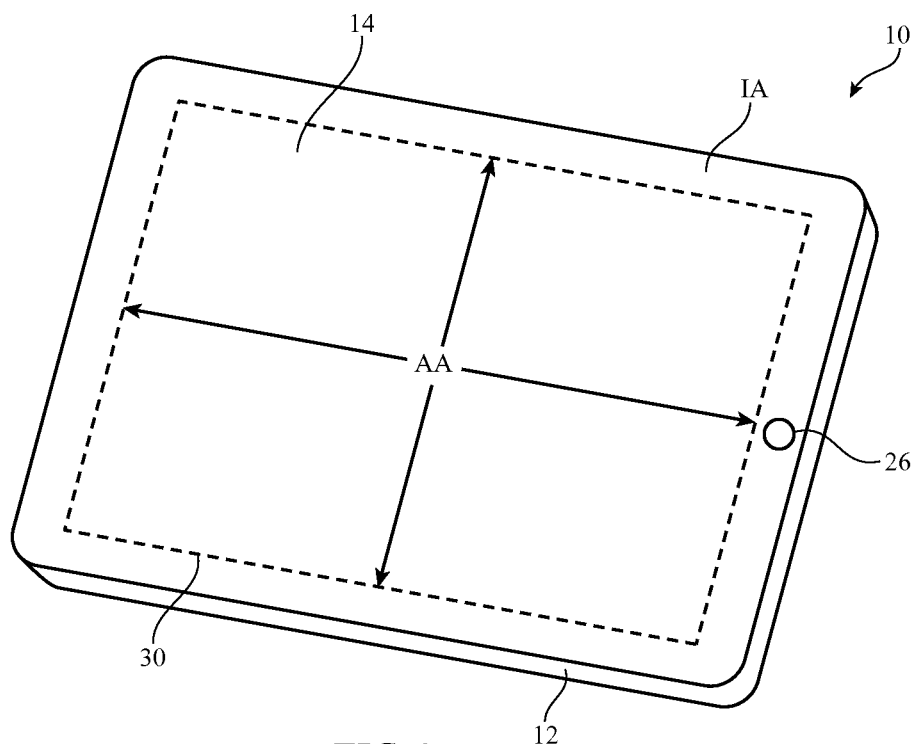
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
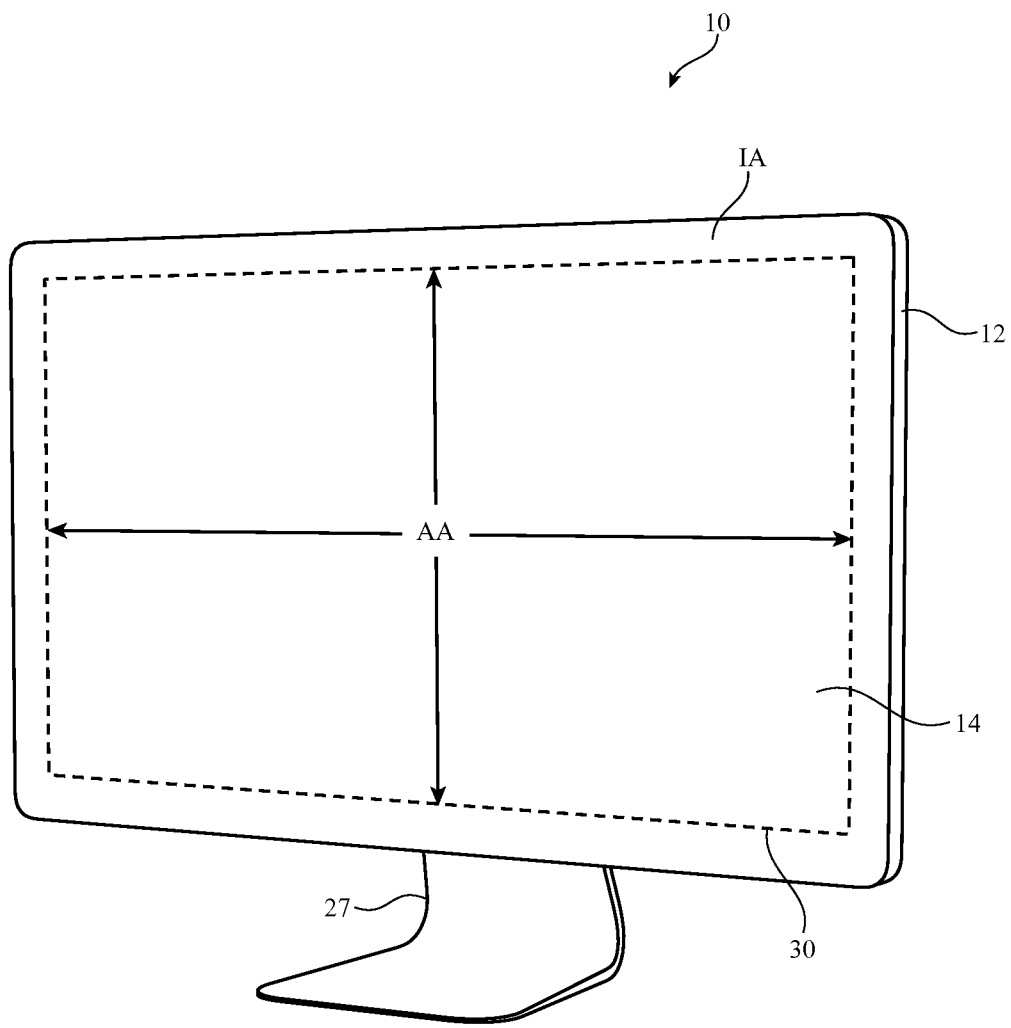
FIG. 4 is a perspective view of an illustrative electronic device such as a computer display with a display in accordance with an embodiment.

FIG. 4 shows how electronic device 10 may be a display such as a computer display or may be a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Display 14 may contain an array of active display pixels within rectangular region 30. This region may sometimes be referred to as the active area of the display. As shown in FIGS. 1, 2, 3, and 4, active area AA may be surrounded by inactive display areas IA that do not contain active display pixels. Inactive areas IA may be formed on the upper and lower edges of display 14 and/or on the right and left sides of display 14. In some arrangements, inactive areas IA may form a rectangular ring-shaped region that surrounds the periphery of active display region AA. The display cover layer and/or other display layers in display 14 may be provided with opaque masking structures in the inactive region to hide internal components from view by a user. For example, the underside of a display cover layer in inactive region IA may be coated with a layer of black or white ink.

Figure 5:
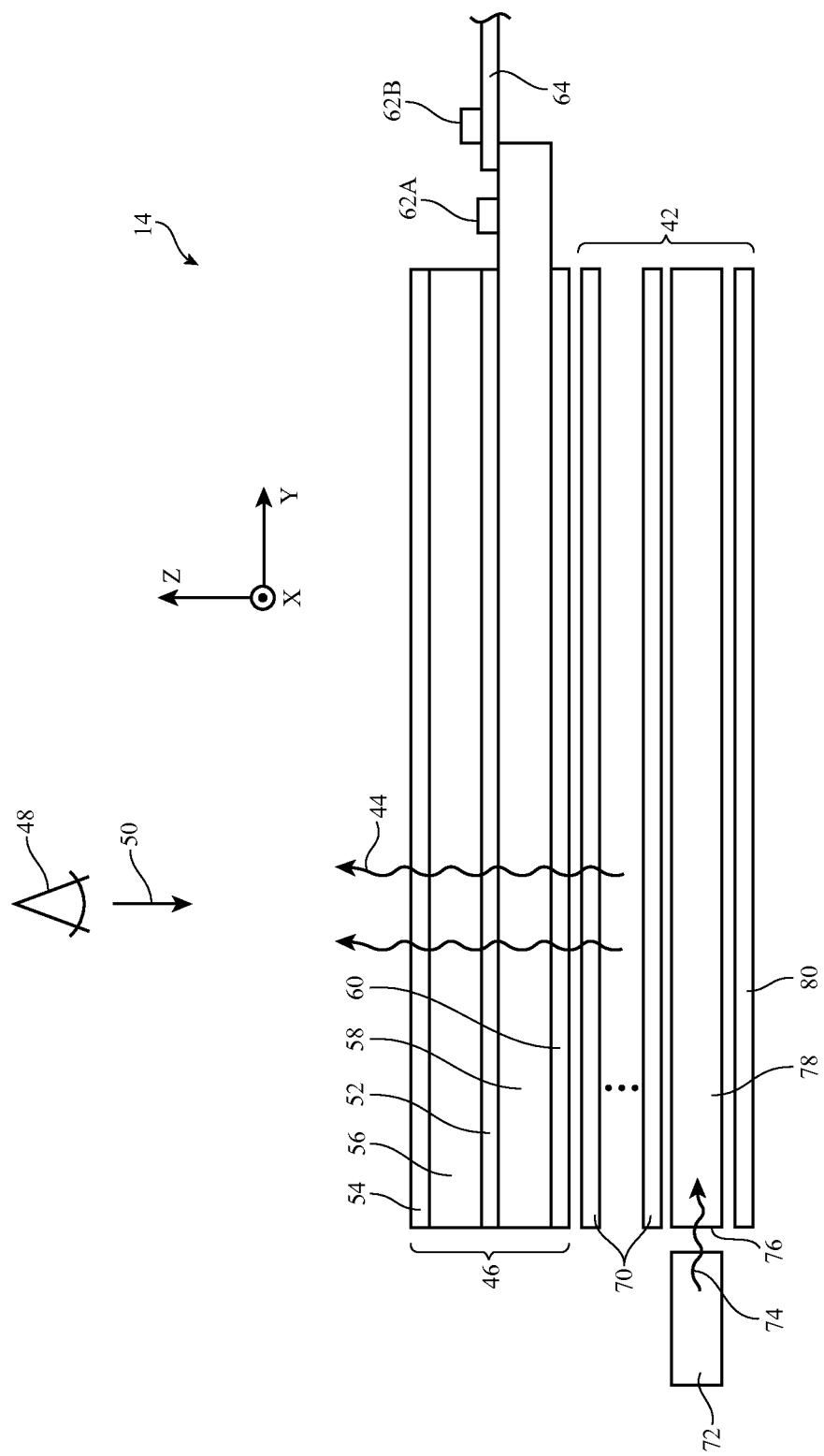
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction from light guide plate 78 may serve as backlight 44 for display 14. Light 74 that scatters downwards may be reflected back in the upwards direction by reflector 80. Reflector 80 may be formed from a reflective material such as a layer of plastic covered with a dielectric minor thin-film coating. Reflective tape (e.g., white plastic tape or tape formed from other reflective materials) may be incorporated into the backlight reflector for display 14. For example, backlight structures 42 may include a strip of tape that runs along the edge of reflector 80 that is adjacent to light-emitting diodes 72.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
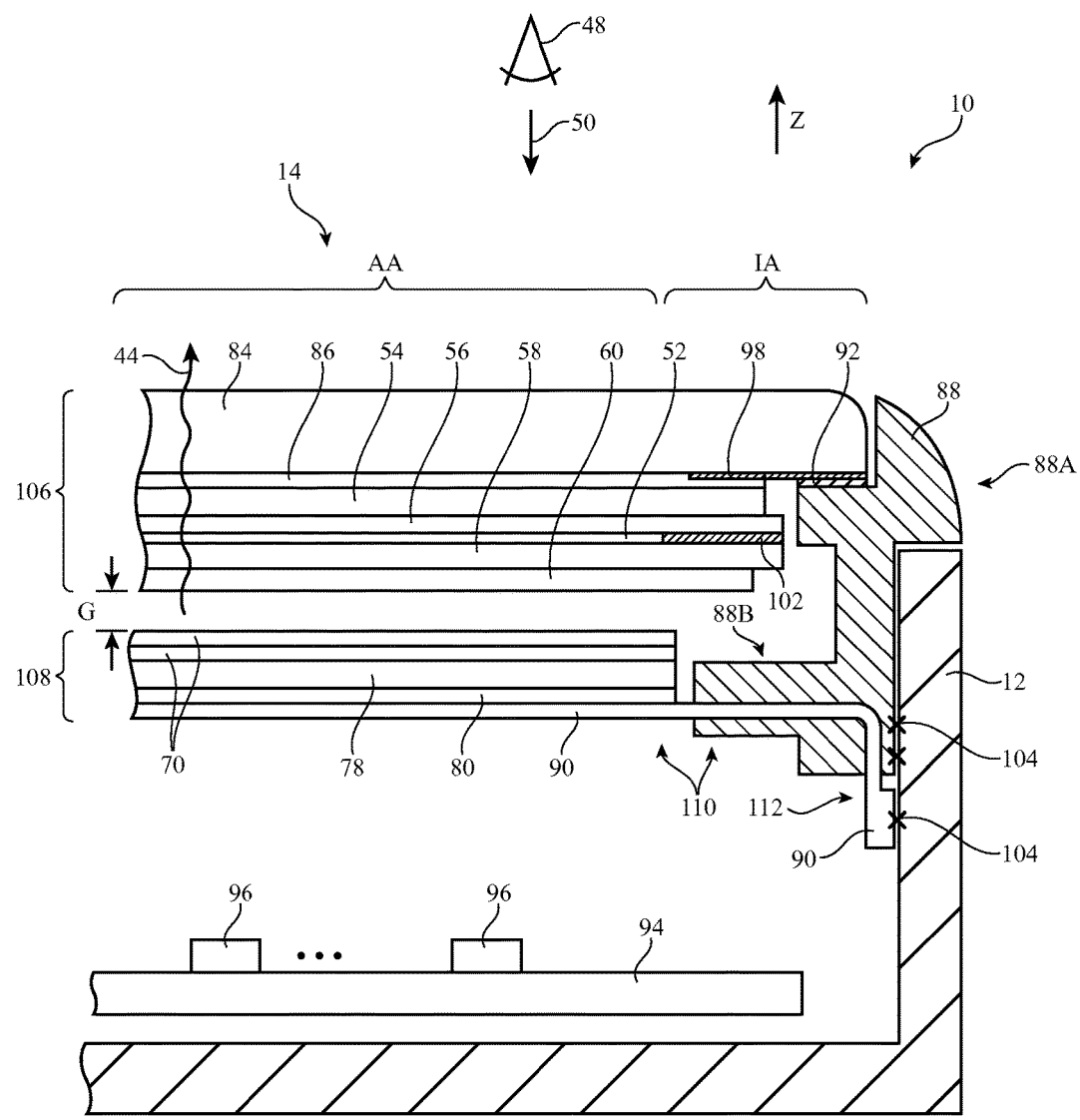
FIG. 6 is a cross-sectional side view of an illustrative display that has been mounted in an electronic device using a support structure that is integral with a backlight in accordance with an embodiment.

A cross-sectional side view of display 14 mounted in device 10 is shown in FIG. 6. As shown in FIG. 6, display 14 and additional components such as components 96 may be mounted in electronic device housing 12.

Electronic device housing 12 may be formed from plastic, metal, glass, ceramic, fiber-based composites, other materials, and combinations of these materials. As an example, housing 12 may include metal sidewall structures such as vertical metal walls or other suitable housing structures. The metal walls may run around the periphery of electronic device housing 12 and may sometimes be referred to as a peripheral metal band or peripheral conductive housing structures. The example of FIG. 6 in which the sides of device housing 12 are planar is merely illustrative. If desired, the sides of device housing 12 may be curved. For example, the outer surface of device housing 12 may have a curve that matches the curved surface of cover layer 84.

Components 96 may be electrical components such as integrated circuits, connectors, batteries, discrete devices such as resistors, capacitors, and inductors, switches, and other electronic devices. Components 96 may be mounted to one or more substrates such as substrate 94. Substrate 94 may be coupled to additional substrates in device 10 using connectors, cables, flexible printed circuit paths, and other interconnect pathways. Substrates such as substrate 94 may be formed from molded plastic, ceramic, glass, or printed circuits (as examples). For example, substrates such as substrate 94 may be formed from rigid printed circuit boards (e.g., printed circuits formed from rigid layers of material such as fiberglass-filled epoxy) or flexible printed circuits (e.g., flexible sheets of polyimide or other flexible layers of polymer).

Electrical components such as components 96 may be electrically connected to conductive paths in substrates such as substrate 94. The conductive paths in substrates such as substrate 94 may sometimes be referred to as lines, traces, or interconnects and may be formed from conductive materials such as metal (e.g., copper, gold, aluminum, etc.). Using these printed circuit paths, components 96 may be interconnected with each other and may be interconnected with other components in device 10 such as display 14.

Display 14 may include active display pixels in active area AA and may be devoid of active display pixels in inactive area IA. Display 14 may include layers such as display cover layer 84. Display cover layer 84 may be formed from a clear layer of glass, a transparent plastic layer, or other transparent material. Display cover layer 84 may have the shape of a rectangular member or may have other shapes such as shapes with a curved cross-sectional profile and/or a footprint with curved edges. In the example of FIG. 6, the upper surface of cover layer 84 is flat in the central portion of display 14 and curved at the edges.

Display module 46 may be attached to the underside of display cover layer 84 using adhesive layer 86 (e.g., a layer of optically clear adhesive or other suitable adhesive). In inactive area IA, opaque masking material 98 may be formed on the underside of display cover layer 30. Opaque masking material 98 may be formed from an opaque material such as black ink, white ink, substances with colors other than black or white, metal, opaque metal oxides, combinations of these substances, or other opaque material. The layers of display module 46 may also be provided with a peripheral strip of opaque masking material such as opaque masking material 102.

Display module 46 may be a liquid crystal display module or may be a display module based on other display technologies. Touch screen functionality may be incorporated into display module 46 if desired (e.g., by providing display module 46 with an array of transparent capacitive touch sensor electrodes such as electrodes formed from indium tin oxide). In the FIG. 6 example, display module 46 is a liquid crystal display module having a layer of liquid crystal material 52 sandwiched between an upper display layer such as color filter layer 56 and a corresponding lower display layer such as thin-film transistor layer 58.

Color filter layer 56 may be used to provide display 14 with the ability to display color images. Color filter layer 56 may have a substrate formed from clear glass, transparent plastic, or other clear substrate material. An array of color filter elements such as red, green, and blue polymer color filter elements may be formed on the underside of color filter layer 56.

Thin-film transistor layer 58 may have a substrate formed from a layer of clear glass, a sheet of transparent plastic, or other clear substrate layer. The upper surface of thin-film transistor layer 58 may have a layer of thin-film transistor circuitry that includes thin-film transistors and electrodes. Using the thin-film transistors, the electrodes may be used to adjust the strength of electric fields applied to the array of display pixels in active area AA.

Backlight unit 42 may be used to provide backlight 44 that travels upwards through display module 46 in direction to viewer 48. The layers of display module 46 such as color filter layer 56, thin-film transistor layer 58, and liquid crystal layer 52 may be sandwiched between polarizer layers such as upper polarizer 54 and lower polarizer 60. During operation of display 14, adjustments to the electric fields supplied by the electrodes in thin-film transistor layer 58 can be used to create changes to liquid crystal layer 52 that rotate the polarization of light 44 by corresponding amounts. The rotation of the polarization of light 44 in combination with the presence of upper and lower polarizers 54 and 60 adjusts the amount of light 44 that is transmitted to viewer 48. This allows display 14 to be used to display images to viewer 48.

If desired, opaque masking material 102 may be provided between the substrates associated with color filter layer 56 and thin-film transistor layer 58. For example, opaque masking material may be provided on the underside of color filter layer 56.

Display module 46 may be attached to display cover layer 84 using adhesive 86 to form display module assembly 106. Display module assembly 106 may be mounted in housing 12 using portion 88A of support structure 88. Cover layer 84 and/or other display layers in assembly 106 may be mounted to portion 88A of support structure 88 using attachment members such as attachment member 92. Attachment member 92 may be an adhesive (e.g., heat-cured adhesive, light-cured adhesive, pressure-sensitive adhesive, or other adhesive), a fastener, or other mounting structure.

Support structure 88 (sometimes referred to as cover layer support structure 88) may be one of multiple structures that together form a chassis for display module assembly 106. Support structure 88 may formed from plastic, glass, ceramic, metal, fiber-based materials, other materials, or combinations of these materials.

Backlight assembly 108 may include backlight structures 42 (sometimes be referred to as a backlight unit) and backlight chassis 110 within which backlight structures 42 are mounted. Backlight structures 42 may include reflector 80 and light guide plate 78. Light guide plate 78 may be formed from a clear sheet of material such as a layer of transparent plastic. Light-emitting diodes or other light sources may be used to launch light into one or more of the peripheral edges of light guide plate 78.

Optical films 70 may be incorporated into backlight unit 42 to help improve the quality of the backlight produced by light guide plate 78 and reflector 80. Optical films 70 may, as an example, include one or more, two or more, or three or more layers for improving the homogeneity and directionality of emitted backlight 44. Examples of optical films 70 include diffuser films and brightness enhancement films (sometimes referred to as turning films or prism films).

Backlight unit chassis 110 may be formed from plastic, metal, fiber-based composites, glass, ceramic, or other suitable material. As an example, backlight unit chassis 110 may be formed from one or more metal structures such as metal chassis 90 (sometimes referred to as an m-chassis, metal plate, or metal frame) and one or more plastic structures such as plastic chassis structure 88B (e.g., a lower portion of cover layer support structure 88). Plastic chassis structure 88B may be attached to metal plate 90 using adhesive, screws or other fasteners, or other attachment mechanisms. As an example, plastic chassis structures 88B may be molded to metal plate 90 using plastic molding equipment such as plastic injection molding equipment (e.g., plastic chassis structures 88B may be insert molded around portions of metal plate 90).

After forming backlight unit chassis 110, the layers of backlight unit 42 may be assembled into backlight unit chassis 110. As an example, backlight unit chassis 110 may be configured to form a recessed rectangular support structure (e.g., a rectangular recess) into which display backlight unit layers such as reflector 80, light guide plate 78, and optical films 70 may be placed in succession. During backlight unit assembly operations, backlight unit chassis 110 may be maintained in an upright position (as shown in FIG. 6) without flipping over backlight unit chassis 110.

Device 10 may be provided with structural strength and rigidity using internal sheet metal structures. These internal sheet metal structures may individually or collectively span the width (and, if desired, the length) of housing 12. The internal sheet metal structures may, as an example, be formed from one or more thin metal plate structures (e.g., a metal sheet with a thickness of less than 1 mm, less than 0.5 mm, or less than 0.3 mm) that run across device 10 in a position that is vertically roughly midway between the outer surface of display cover layer 84 and the rear surface of housing 12. Because of this illustrative position in the middle of device 10, the internal sheet metal structures that are used in providing device 10 with structural support may sometimes be referred to as midplate structures, a housing midplate, or a housing midplate member. If desired, the housing midplate may be formed from multiple stamped metal structures that are attached to each other through overmolded plastic structures, provided that the resulting midplate is able to provide device 10 with structural support. Once the midplate has been properly attached to housing structures such as the left and right housing walls of housing 12, the tendency of housing 12 to twist during use will be minimized.

If desired, device 10 may be provided with a midplate that is also used as part of backlight unit 42. In particular, metal plate 90 may serve as both a housing midplate that stabilizes device 10 and housing 12 against undesirable twisting and as the lower support surface for the layers of display backlight unit 42 in display backlight unit chassis 110. By using metal plate 90 both as a housing midplate and as a part of backlight unit chassis 110, the thickness of device 10 can be reduced and/or additional components 96 can be incorporated into the interior of device 10 without need to adjust the overall thickness of device 10. This is, however, merely illustrative. If desired, metal plate 90 may be separate from a metal midplate member in device 10 or device 10 may not include a metal midplate member.

During assembly operations, the structures of display module assembly 106 and the structures of backlight assembly 108 may be assembled separately to form two unitary structures. The two assemblies may each be mounted directly into device housing 12 prior to being coupled to one another or the two assemblies may be coupled together to form a single unitary structure and then mounted within housing 12.

Care should be taken to ensure that abrasive contact between backlight unit 42 and display module 46 does not occur. In some arrangements, it may be desirable to maintain a gap such as air gap between the lowermost layer of display module 46 (e.g., polarizer 60) and the uppermost layers of backlight unit 42 (e.g., optical films 70).

To maintain a desired tolerance between display module 46 and backlight unit 42, support structures that support display module 46 may be integrated with support structures that support backlight unite 42. In the example of FIG. 6, cover layer support member 88A and backlight plastic chassis 88B are formed from a unitary support structure 88. Upper portion 88A of support structure 88 forms a display module chassis that surrounds display module 46 and supports cover layer 84. Lower portion 88B of support structure 88 is overmolded onto metal backlight chassis 90 and forms a plastic frame (sometimes referred to as a p-chassis) that surrounds or partially surrounds backlight module 42.

If desired, support structure 88 may be insert molded or overmolded onto other metal structures such as one or more metal legs around the rectangular periphery of display 14. For example, there may be one, two, three, or more than three chassis legs on each side of display 14. The legs may include holes for accommodating screws or other fastening structures.

As shown in FIG. 6, support structure 88 and the other portions of display module assembly 106 and/or backlight assembly 108 may be attached to midplate 90 of display backlight unit 42 and to housing 12 using attachment structures 104. Attachment structures 104 such as welds, solder, screws, clips, rivets, or other fasteners, adhesive, overmolded plastic, or other connection mechanisms may also be used in mounting display unit structures such as midplate 90 in chassis 110 of backlight unit 42 to housing 12. For example, portions 112 of the bent edges of metal plate 90 may be attached to housing 12 using attachment structures 104. If desired, one or more screws or other attachment structures 104 may be used to attach metal legs of chassis 88 to downwardly bent peripheral edge portions of metal plate 90 and welds or other attachment structures 104 may be used to attach portions 112 of metal plate 90 to metal housing walls in housing 12 or other metal housing structures. These are merely illustrative arrangements for attaching assembly 106 and backlight assembly 108 into electronic device housing 12. Other mounting arrangements may be used, if desired.

Figure 7:
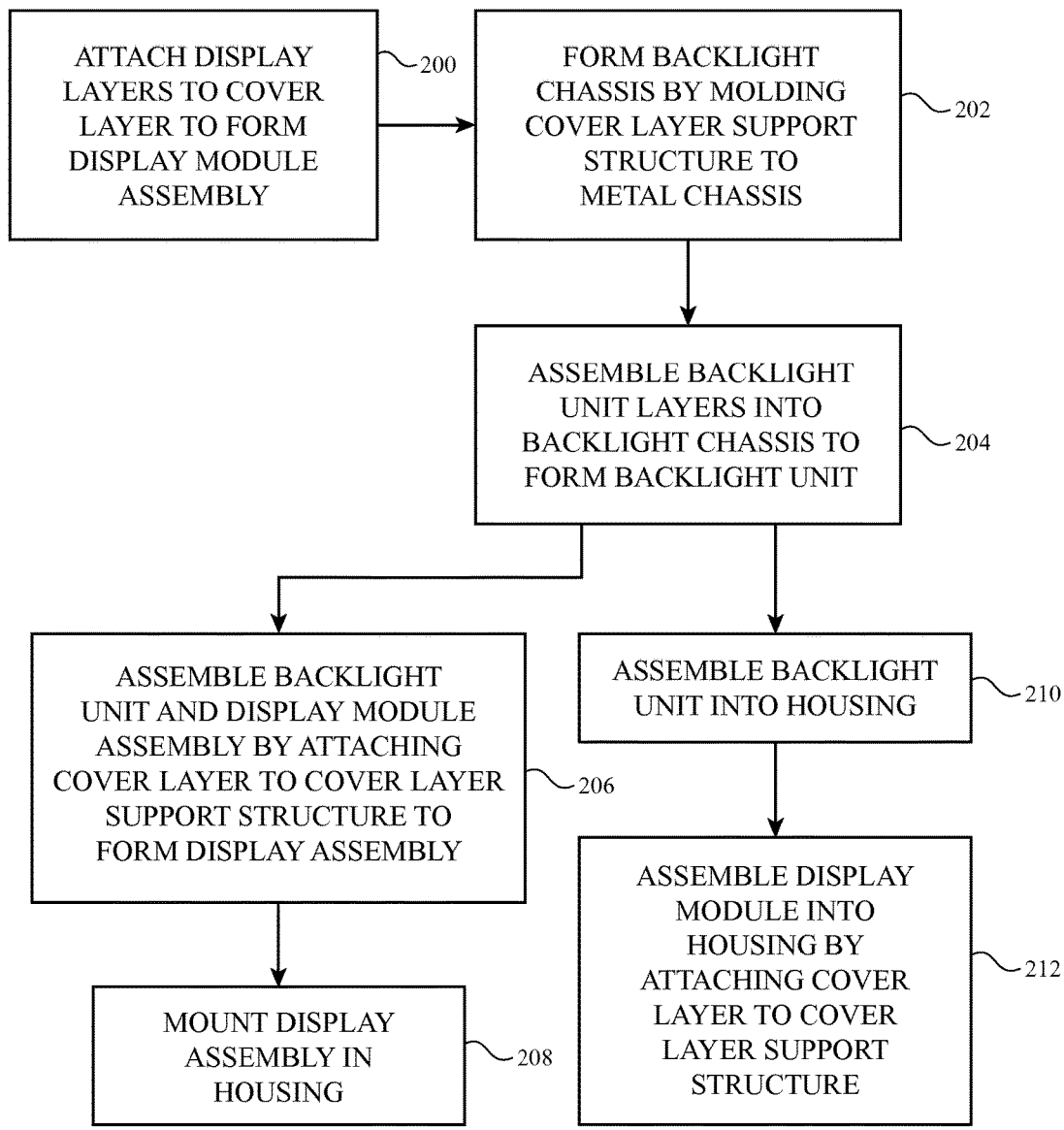
FIG. 7 is a flow chart of illustrative steps involved in forming electronic devices with backlit displays of the type shown in FIG. 6 in accordance with an embodiment.

A flow chart of illustrative steps involved in assembling display module and backlight unit structures to form an electronic device such as device 10 of FIG. 6 is shown in FIG. 7.

At step 200, display module assembly 106 may be formed by attaching display module 46 to cover layer 84 using an adhesive such as adhesive layer 86.

At step 202, backlight chassis 110 may be formed by attaching chassis structures such as cover layer support structures 88 to chassis structures such as planar support structure 90. For example, plastic chassis structures 88 may be injection molded over portions of metal midplate 90. Support structure 88 may, for example, be molded to have an upper shelf portion 88A configured to support display layers (e.g., cover layer 84 of FIG. 6 or other suitable display layer) and a lower frame portion 88B configured to support and at least partially surround backlight layers. Lower frame portion 88B may be insert molded or overmolded onto metal frame 90. If desired, metal frame 90 of chassis 110 may serve both as a planar support structure for the layers of material mounted in the rectangular recess in chassis 110 and as a planar structural housing member that spans the width of housing 12 from sidewall to sidewall.

Metal plate 90 may have a rectangular outline with bent edge portions, leg-shaped tabs with screw hole openings, and/or other structures that facilitate attachment of midplate 90 within housing 12 and attachment of backlight unit 42 to display module assembly 46. Chassis structures 110 may have the shape of a rectangular ring with a rectangular outer periphery that fits within a rectangular housing interior defined by a corresponding rectangular inner sidewall surface of housing 12. The center of chassis structures 110 may have a rectangular opening into which rectangular backlight unit layers may be placed such as a rectangular reflector 80, a rectangular light guide plate 78, and rectangular optical films 70. The lateral dimensions of the backlight unit layers need not all be the same. For example, reflector 80 and light guide plate 78 may have a smaller rectangular footprint than optical films 70, if desired.

After forming backlight unit chassis 110, backlight unit layers such as layers 80, 78, and 70 may be mounted within the rectangular recess formed by chassis structures 110 (at step 204), thereby forming backlight assembly 108.

At step 206, display module assembly 106 may be mounted to backlight assembly 108 using support structure 88. For example, support structure 88 may have an upper shelf portion 88A on which cover layer 84 rests, as shown in FIG. 6. An attachment member such as adhesive layer 92 may be used to attach cover layer 84 to shelf portion 88A of support structure 88. Step 206 may include, for example, applying light or heat to cure adhesive 92 and thereby bond cover layer 84 to support structure 88. Because support structure 88 is integral with backlight chassis 110, mounting cover layer 84 to support structure 88 may define a distance between display module 46 and backlight unit 42 (e.g., a desired air gap between lower polarizer 60 of display module 46 and optical films 70 of backlight 42). Display module assembly 106 and backlight assembly 108 may sometimes be referred to as a display assembly when the two assemblies are attached to one another.

At step 208, the display assembly formed in step 206 may be mounted in housing 12 to form device 10. For example, attachment mechanisms 104 such as welds or other attachment mechanisms may be used in attaching bent metal edge portions 112 of metal frame 90 to metal walls in housing 12.

If desired, backlight assembly 108 formed in steps 202 and 204 may be mounted in housing 12 prior to being attached to display module assembly 106. For example, prior to attaching backlight assembly 108 to display module assembly 106, assembly operations may proceed to step 210. At step 210, backlight assembly 108 including backlight unit 42 and backlight chassis 110 may be mounted within housing 12. When mounting backlight assembly 108 within housing 12, attachment structures 104 such as welds, screws, or other structures may be used in attaching metal chassis 90 of backlight assembly 108 to the inner surface of a metal electronic device housing wall or other portion of housing 12.

At step 212, display module assembly 106 may be mounted in housing 12. For example, support structure 88 of backlight assembly 108 may have an upper shelf portion 88A on which cover layer 84 rests, as shown in FIG. 6. An attachment member such as adhesive layer 92 may be used to attach cover layer 84 to shelf portion 88A of support structure 88. Light or heat may be applied to cure adhesive 92 and thereby bond cover layer 84 to support structure 88. Because support structure 88 is integral with backlight chassis 110, mounting cover layer 84 to support structure 88 may define a distance between display module 46 of assembly 106 and backlight unit 42 of assembly 108.

In some scenarios, it may be desirable to attach cover layer 84 to support structure 88 prior to assembling display module assembly 106 with backlight unit 108 and/or prior to attaching display layers 46 to cover layer 84. For example, bonding cover layer 84 to support structure 88 may, in some arrangements, involve adhesive attachment processes that could potentially damage other components in the display.

Figure 8:
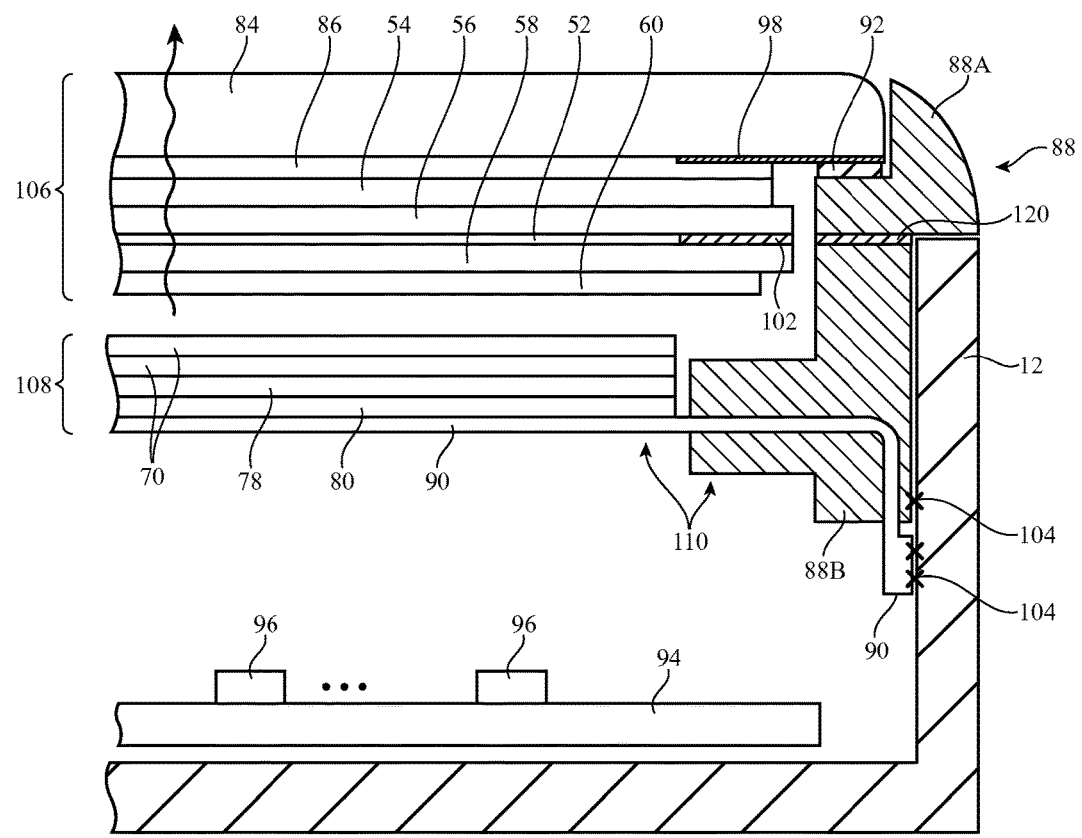
FIG. 8 is a cross-sectional side view of an illustrative display that has been mounted in an electronic device using a multiple-part support structure that is integral with a backlight in accordance with an embodiment.

To accommodate these types of attachment processes while maintaining the benefits of integrating cover layer support structures with backlight support structures, an arrangement of the type shown in FIG. 8 may be used.

As shown in FIG. 8, cover layer support structure 88 may include multiple parts such as first portion 88A and second portion 88B. Similar to the arrangement of FIG. 6, support structure 88 forms both a mounting surface for cover layer 84 as well as a backlight chassis to support backlight unit 42. In the example of FIG. 8, however, upper portion 88A of support structure 88 that is attached to cover layer 84 is separate from portion 88B that forms part of backlight chassis 110. If desired, a layer of adhesive such as adhesive 120 may be used to attach upper portion 88A to lower portion 88B to form support structure 88. This is, however, merely illustrative. If desired, other attachment structures such as welds, solder, screws, clips, rivets, or other fasteners, adhesive, overmolded plastic, or other connection mechanisms may be used to attach portion 88A to portion 88B.

By forming support structure 88 from multiple pieces, attachment operations that may otherwise damage certain parts of display 14 may be performed without risking harm to those parts of the display. For example, adhesive 92 may be applied and cured to attach cover layer 84 to upper support structure 88A prior to attaching upper support structure 88A to lower support structure 88B with adhesive 120. This ensures that the operations associated with curing adhesive 92 (e.g., application of heat, force, light, etc.) do not damage backlight unit components 42 that are mounted in support structure 88B of backlight chassis 110. If desired, there may be two, three, four, or more than four parts that make up support structure 88. The two-piece example of FIG. 8 is merely illustrative.

The examples of FIGS. 6 and 8 in which support structure 88 and backlight chassis 110 include multiple discrete parts (e.g., a plastic support structure such as support structure 88 and a metal support structure such as metal frame 90) is merely illustrative. If desired, cover layer support structure 88 and metal chassis 90 may be formed from one piece of material (e.g., a single piece of plastic, metal, or other suitable material).

Figure 9:
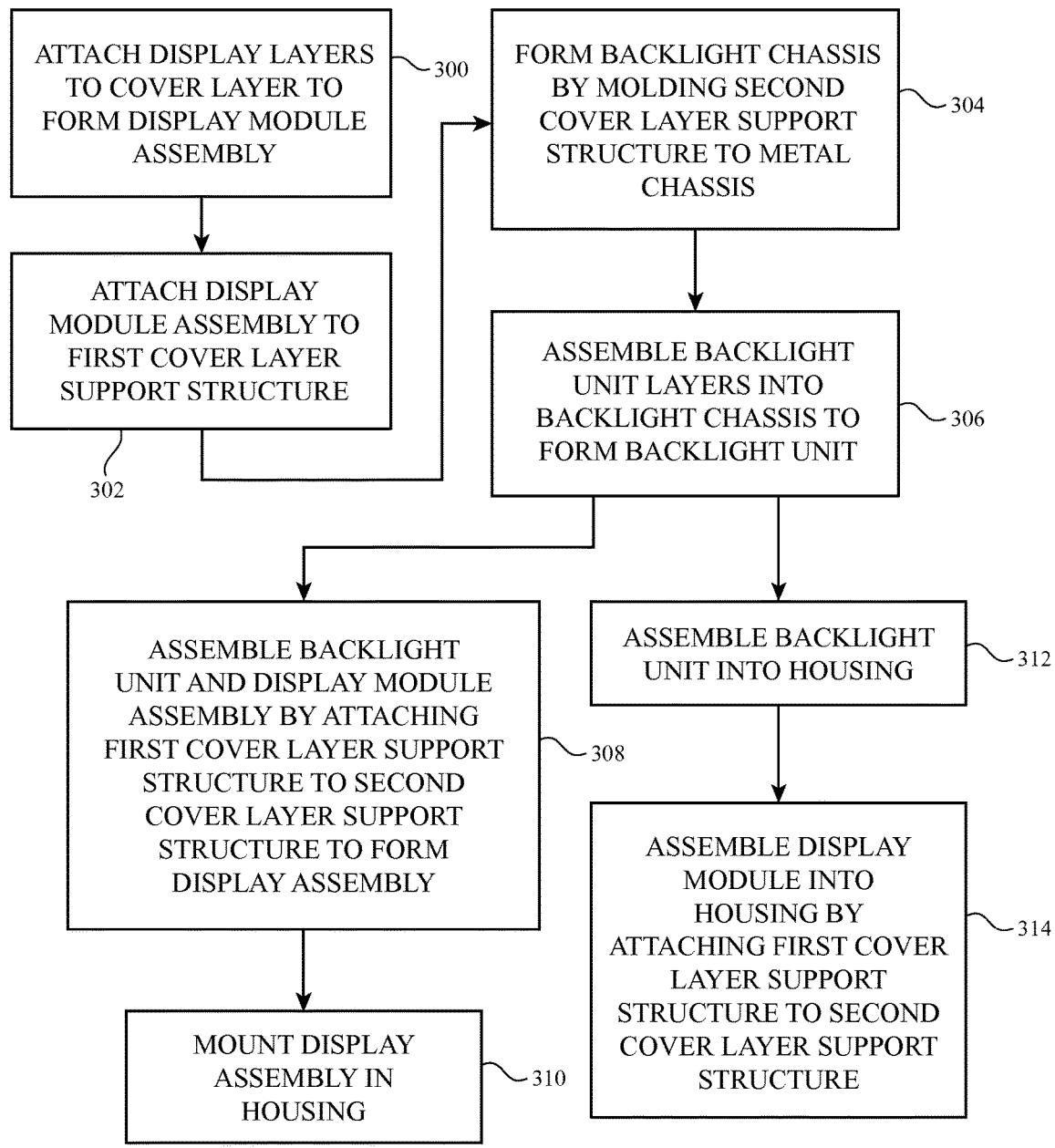
FIG. 9 is a flow chart of illustrative steps involved in forming electronic devices with backlit displays of the type shown in FIG. 8 in accordance with an embodiment.

A flow chart of illustrative steps involved in assembling display module and backlight unit structures to form an electronic device such as device 10 of FIG. 8 is shown in FIG. 9.

At step 300, display module assembly 106 may be formed by attaching display module 46 to cover layer 84 using an adhesive such as adhesive layer 86.

At step 302, display module assembly 106 may be mounted to first portion 88A of support structure 88. For example, portion 88A of support structure 88 may have a shelf region on which cover layer 84 rests, as shown in FIG. 8. An attachment member such as adhesive layer 92 may be used to attach cover layer 84 to portion 88A of support structure 88. Step 302 may include, for example, applying light and/or heat to cure adhesive 92 and thereby bond cover layer 84 to support structure 88A.

At step 304, backlight chassis 110 may be formed by attaching chassis structures such as portion 88B of cover layer support structure 88 to chassis structures such as planar support structure 90. For example, one or more plastic chassis structures 88B may be injection molded over portions of metal midplate 90 Portion 88B of support structure 88 may be insert molded or overmolded onto metal frame 90. If desired, metal frame 90 of chassis 110 may serve both as a planar support structure for the layers of material mounted in the rectangular recess in chassis 110 and as a planar structural housing member that spans the width of housing 12 from sidewall to sidewall.

Metal plate 90 may have a rectangular outline with bent edge portions, leg-shaped tabs with screw hole openings, and/or other structures that facilitate attachment of midplate 90 within housing 12 and attachment of backlight unit 42 to display module assembly 46. Chassis structures 110 may have the shape of a rectangular ring with a rectangular outer periphery that fits within a rectangular housing interior defined by a corresponding rectangular inner sidewall surface of housing 12. The center of chassis structures 110 may have a rectangular opening into which rectangular backlight unit layers may be placed such as a rectangular reflector 80, a rectangular light guide plate 78, and rectangular optical films 70. The lateral dimensions of the backlight unit layers need not all be the same. For example, reflector 80 and light guide plate 78 may have a smaller rectangular footprint than optical films 70, if desired.

After forming backlight unit chassis 110, backlight unit layers such as layers 80, 78, and 70 may be mounted within the rectangular recess formed by chassis structures 110 (at step 306), thereby forming backlight assembly 108.

At step 308, display module assembly 106 may be mounted to backlight assembly 108 using support structure 88. For example, support structures 88 may include an upper shelf portion 88A on which cover layer 84 rests and a lower frame portion 88B supporting backlight unit 42, as shown in FIG. 8. An attachment member such as adhesive layer 120 may be used to attach shelf portion 88A of support structure 88 to frame portion 88B of support structure 88. Because lower support structure 88B is integral with backlight chassis 110 and upper support structure 88A supports cover layer 84, coupling structures 88A and 88B together may define a distance between display module 46 and backlight unit 42 (e.g., a desired air gap between lower polarizer 60 of display module 46 and optical films 70 of backlight 42). Display module assembly 106 and backlight assembly 108 may sometimes be referred to as a display assembly when the two assemblies are attached to one another.

At step 310, the display assembly formed in step 308 may be mounted in housing 12 to form device 10. For example, attachment mechanisms 104 such as welds or other attachment mechanisms may be used in attaching bent metal edge portions 112 of metal frame 90 to metal walls in housing 12.

If desired, backlight assembly 108 formed in steps 304 and 306 may be mounted in housing 12 prior to being attached to display module assembly 106. For example, prior to attaching backlight assembly 108 to display module assembly 106, assembly operations may proceed to step 312. At step 312, backlight assembly 108 including backlight unit 42 and backlight chassis 110 may be mounted within housing 12. When mounting backlight assembly 108 within housing 12, attachment structures 104 such as welds, screws, or other structures may be used in attaching metal chassis 90 of backlight assembly 108 to the inner surface of a metal electronic device housing wall or other portion of housing 12.

At step 314, display module assembly 106 may be mounted in housing 12. For example, support structure 88A of display assembly 106 may be attached to support structure 88B of backlight assembly 108, as shown in FIG. 8. An attachment member such as adhesive layer 120 may be used to attach upper portion 88A to lower portion 88B. Because support structure 88 is integral with backlight chassis 110, mounting cover layer 84 to support structure 88 may define a distance between display module 46 of assembly 106 and backlight unit 42 of assembly 108.

If desired, cover layer 84 may be attached to upper support structure 88A prior to attaching display layers 46 to cover layer 84 (e.g., step 302 may be performed prior to step 300). This may help ensure that display layers 46 are not damaged during the operations associated with curing adhesive 92.

The foregoing is merely illustrative and various modifications can be made by those skilled in the art without departing from the scope and spirit of the described embodiments. The foregoing embodiments may be implemented individually or in any combination.

What is claimed is:

1. An electronic device having a display, wherein the display comprises:
    a backlight unit including backlight structures supported by a metal chassis;
    a display module assembly including a display module attached to a display cover layer; and
    a support structure having an upper surface that supports the display cover layer and a lower portion that is molded over the metal chassis, wherein the metal chassis has opposing upper and lower surfaces that are parallel to the upper surface of the support structure, and wherein the support structure contacts the upper and lower surfaces of the metal chassis.

2. The electronic device defined in claim 1 further comprising:
    an electronic device housing in which the display is mounted, wherein a portion of the support structure is interposed between the display cover layer and the electronic device housing.

3. The electronic device defined in claim 1 further comprising an adhesive that attaches a lower surface of the display cover layer to the upper surface of the support structure.

4. The electronic device defined in claim 1 wherein the support structure surrounds the display cover layer.

5. The electronic device defined in claim 1 wherein the metal chassis has a first portion that lies in a plane and a second portion that is bent out of the plane, wherein the support structure is molded over the first and second portions of the metal chassis.

6. The electronic device defined in claim 1 wherein the display module comprises:
    a color filter layer;
    a thin-film transistor layer; and
    a liquid crystal layer interposed between the color filter layer and the thin-film transistor layer.

7. The electronic device defined in claim 1 further comprising a metal electronic device housing in which the display is mounted, wherein the metal chassis is welded to the metal electronic device housing.

8. The electronic device defined in claim 1 wherein the backlight unit comprises:
    a plurality of optical films;
    a reflector; and
    a light guide plate interposed between the plurality of optical films and the reflector.

9. The electronic device defined in claim 1 wherein the support structure comprises a plastic support structure.

10. The electronic device defined in claim 1 wherein the backlight unit and the display module are separated by a gap and wherein a size of the support structure determines a size of the gap.

11. A method for forming an electronic device, comprising:
    forming a display backlight unit having a metal chassis and a plastic chassis, wherein forming the display backlight unit comprises injection molding the plastic chassis over the metal chassis; and
    mounting a display module assembly to the display backlight unit by attaching a display cover layer in the display module assembly to an upper surface of the plastic chassis.

12. The method defined in claim 11 wherein forming the display backlight unit comprises mounting a light guide plate within a recess defined by the metal chassis and the plastic chassis.

13. The method defined in claim 11 further comprising mounting the display backlight unit and the display module assembly in an electronic device housing such that a portion of the plastic chassis is interposed between the display cover layer and the electronic device housing.

14. The method defined in claim 13 wherein the electronic device housing comprises a metal electronic device housing and wherein mounting the display backlight unit in the electronic device housing comprises welding the metal chassis to the metal electronic device housing.

15. Apparatus, comprising:
    a backlight unit;
    a support structure that supports the backlight unit, wherein the support structure comprises a plastic frame molded to a metal support member, wherein the plastic frame has first and second surfaces, and wherein the metal support member passes through the plastic frame from the first surface to the second surface;
    a display module having a transparent cover layer; and
    an adhesive that attaches a lower surface of the transparent cover layer to an upper surface of the plastic frame.

16. The apparatus defined in claim 15 wherein the display module comprises a liquid crystal display module that is attached to the lower surface of the transparent cover layer with adhesive.

17. The apparatus defined in claim 15 wherein the backlight unit comprises a light guide plate and wherein the metal support member extends under the light guide plate.

18. The apparatus defined in claim 15 further comprising:
    a metal housing in which the backlight unit and the display module are mounted, wherein a portion of the plastic frame is interposed between the transparent cover layer and the metal housing.

19. The apparatus defined in claim 18 wherein the metal support member is attached to the metal housing.

20. The electronic device defined in claim 1 wherein the support structure forms an outermost surface of the electronic device.

* * * * *